US006807468B2

(12) United States Patent
Campbell

(10) Patent No.: US 6,807,468 B2
(45) Date of Patent: Oct. 19, 2004

(54) METHOD FOR ESTIMATING WIND

(75) Inventor: Charles R. Campbell, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/207,156

(22) Filed: Jul. 30, 2002

(65) Prior Publication Data

US 2004/0024500 A1 Feb. 5, 2004

(51) Int. Cl.$^7$ .............................................. G06F 19/00
(52) U.S. Cl. ........................................................ 701/14
(58) Field of Search .............................. 701/14, 3, 4, 7, 701/200, 213

(56) References Cited

U.S. PATENT DOCUMENTS

| 3,699,310 A | 10/1972 | Cole |
| 3,953,856 A | 4/1976 | Hammack |
| 4,303,978 A | 12/1981 | Shaw et al. |
| 4,608,641 A | 8/1986 | Snell |
| 5,136,518 A | 8/1992 | Glover |
| 5,184,304 A | 2/1993 | Huddle |
| 5,216,611 A | 6/1993 | McElreath |
| 5,297,052 A | 3/1994 | McIntyre et al. |
| 5,519,618 A | 5/1996 | Kastner et al. |
| 5,520,356 A | * 5/1996 | Ensley .................. 244/62 |
| 5,574,650 A | 11/1996 | Diesel |
| 5,647,558 A | 7/1997 | Linick |
| 5,960,097 A | 9/1999 | Pfeiffer et al. |
| 6,018,698 A | 1/2000 | Nicosia et al. |

* cited by examiner

Primary Examiner—Y. Beaulieu
(74) Attorney, Agent, or Firm—Burns, Doane, Swecker & Mathis, L.L.P.

(57) ABSTRACT

Attitude, ground velocity, and acceleration inputs from an aircraft Inertial Navigation System (INS) and/or a Global Positioning System (GPS) instrument on board the aircraft, are used to estimate wind velocity relative to the aircraft and/or the ground in three dimensions. A wind velocity in the third dimension is assumed to be zero. In an exemplary embodiment, one or more of a) atmospheric density, b) speed of sound, C) air temperature, d) thrust of the aircraft, e) aerodynamic force coefficients of the aircraft, and f) mass of the aircraft, are used in conjunction with the inputs from the INS/GPS instrument(s) to estimate the wind velocity. Air temperature can be used, for example, together with an ambient air pressure and/or a known altitude of the aircraft to indicate an atmospheric density.

28 Claims, 3 Drawing Sheets

METHOD FOR ESTIMATING WIND

BACKGROUND OF THE INVENTION

1. Field of the Invention

The invention relates generally to the field of aeronautical navigation, and in particular to estimation of wind velocity.

2. Background Information

A need exists to accurately, efficiently and economically estimate wind velocity relative to an aircraft and/or the ground using outputs from an Inertial Navigation System (INS) and/or a Global Positioning System (GPS) instrument on board the aircraft.

SUMMARY OF THE INVENTION

In accordance with an exemplary embodiment of the invention, a method for estimating a velocity of a fluid (e.g., air) in three dimensions relative to a first object (e.g., an aircraft) in the fluid and/or relative to a second object (e.g., the earth or an object in fixed position relative to the earth), includes determining an acceleration of the first object relative to the second object. The method further includes determining a dynamic pressure of the fluid on the first object, determining a thrust vector of the first object relative to the second object, and determining the velocity of the fluid relative to the second object in the three dimensions, based on the determined acceleration, the determined dynamic pressure, the determined thrust vector and an assumption that a speed of the fluid along the third dimension is nominally zero.

In accordance with another exemplary embodiment of the invention, a method for estimating air velocity of a vehicle includes determining a parameter associated with the vehicle, determining a weighting factor to weight each equation in the equation set, based on the determined parameter, and solving the weighted equation set to estimate the air velocity of the vehicle.

In accordance with exemplary embodiments of the invention, the attitude, ground velocity, and acceleration inputs from an aircraft Inertial Navigation System (INS) and/or a Global Positioning System (GPS) instrument on board the aircraft, are used to estimate wind velocity relative to the aircraft and/or the ground in three dimensions. In an exemplary embodiment of the invention, one or more of a) atmospheric density, b) speed of sound, c) air temperature, d) thrust of the aircraft, e) aerodynamic force coefficients of the aircraft, and f) mass of the aircraft, are used in conjunction with the inputs from the INS/GPS instrument(s) to estimate the wind velocity. Air temperature can be used, for example, together with an ambient air pressure and/or a known altitude of the aircraft to indicate an atmospheric density.

The estimate of wind velocity can be desirable, for example, to help an autopilot keep the aircraft stable and guide the aircraft to a destination or waypoint, and to estimate pitch and yaw of the aircraft relative to the airmass through which it is moving. The estimate of wind velocity can also be used to determine an aerial dispense point of free-falling submunitions so that the submunitions will arrive with a desired accuracy and/or pattern at a target or target zone.

BRIEF DESCRIPTION OF THE DRAWINGS

Other objects and advantages of the present invention will become apparent to those skilled in the art from the following detailed description of preferred embodiments, when read in conjunction with the accompanying drawings wherein like elements have been designated with like reference numerals and wherein.

DETAILED DESCRIPTION OF THE PREFERRED EMBODIMENTS

Figure 1:
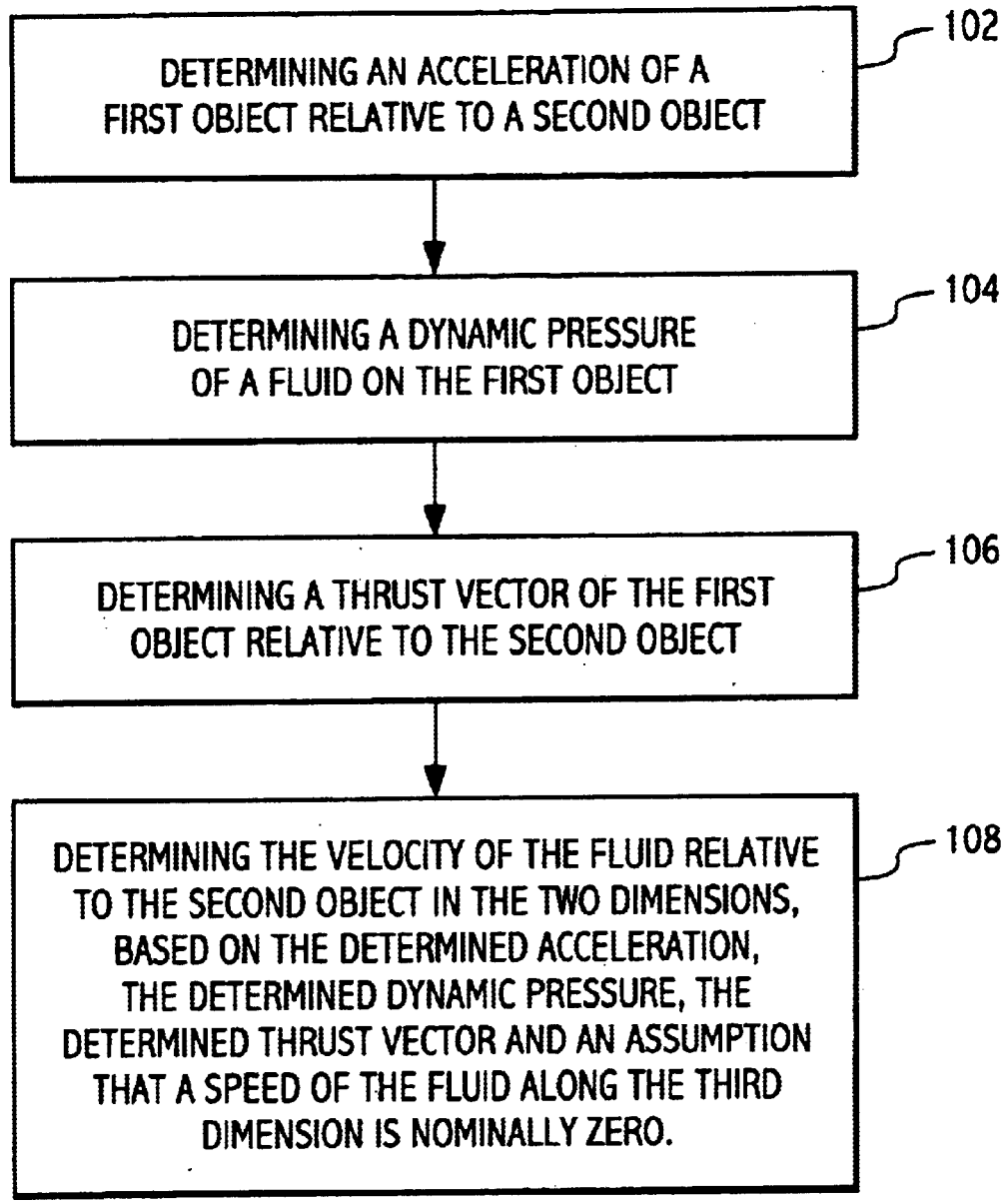
FIG. 1 shows a flow diagram of an exemplary embodiment of the present invention.

FIG. 1 shows a flow diagram of an exemplary embodiment of the present invention. In a first step 102, an acceleration of a first object, for example an aircraft, is determined relative to a second object, for example the earth or an object in fixed position relative to the earth. This can be done using, for example, an Inertial Navigation System (INS) on board the aircraft, and/or a Global Positioning System (GPS) instrument that indicates the aircraft's position (including, for example, orientation) relative to the earth. In a second step 104, a dynamic pressure of a fluid (for example, air) on the first object is determined.

In a next step 106, a thrust vector of the first object relative to the second object is determined. This can be determined, for example, based on the first object's position and orientation relative to the second object, and on a known thrust vector relative to the first object. For example, the thrust vector of an aircraft's jet turbine engine with respect to the aircraft, can be known based on the design of the aircraft. For example, the direction of engine thrust relative to the aircraft nose is determined by design of the aircraft and is therefore known. This knowledge together with knowledge of the aircraft attitude indicates the thrust vector. Some aircraft can vary their thrust vector, for example the Harrier jet aircraft and the YF-23 jet aircraft. For those aircraft, control signals or settings for directing the thrust vector and/or feedback sensors such as nozzle position sensors can indicate the thrust vector relative to the aircraft nose.

In a next step 108, the velocity of the fluid is determined relative to the second object (and/or the first object, since velocity and position/orientation of the first object relative to the second objection is known) based on several factors. The factors include the determined acceleration of the first object relative to the second object, the determined dynamic pressure of the fluid on the first object, the determined thrust vector of the first object, and an assumption that a speed of the fluid along the third dimension is zero. In an exemplary embodiment of the invention, the third dimension is vertical, for example aligned parallel to or coaxial with the earth's gravitational force.

Figure 2:
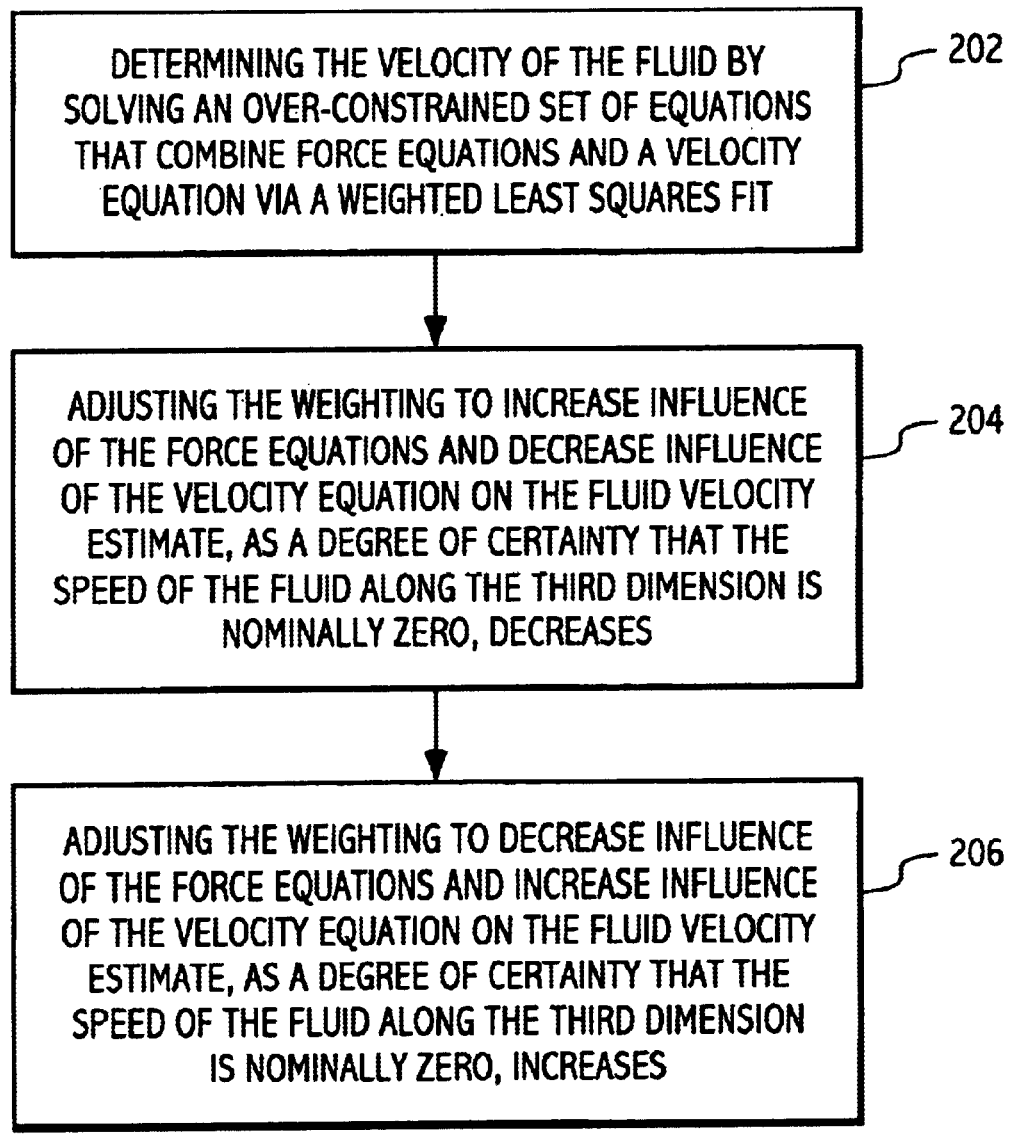
FIG. 2 shows features of an exemplary embodiment of the invention.

FIG. 2 shows exemplary features in accordance with another embodiment of the invention. In step 202, the velocity of the fluid is determined by solving an over-constrained set of equations, where the equation set is a combination of force equations and the third component of the speed of the fluid (which is zero), and the solution is obtained via a weighted least squares fit.

In a next step 204, the weighting of the least squares fit is adjusted based on a probability that the velocity of the fluid in or along the third dimension is zero. Specifically, as the assumption that the velocity of the fluid along the third dimension is zero becomes less certain, the weighting is adjusted to increase influence of the force equations on the solution, and decrease influence of the velocity equation on the solution.

In step 206, the converse situation is addressed. When the certainty of the assumption increases, the weighting is adjusted to increase influence of the velocity equation and decrease influence of the force equations.

Generally speaking, the probability that the wind or airmass has a vertical velocity increases the closer one comes to the earth's surface. This occurs, for example, because topographical variations (e.g., mountains and hills) and thermographic variations of the earth's surface affect movement and behavior of the air. Accordingly, in an exemplary embodiment of the invention the weighting can be adjusted as a function of the aircraft's altitude above mean sea level, or on an altitude above ground level. The weighting can also be adjusted based on lateral speed of the air over the earth's surface, because the speed at which an airmass moves over the earth's surface (e.g., over mountainous areas and/or into another airmass having a different temperature) often influences the vertical movement or speed of the airmass. Various models or estimations of a vertical velocity of the airmass through which the aircraft is moving, can be used separately or together with other factors regarding vertical air movement to influence or adjust the weighting of the force equations vs. the velocity equation.

Specifically, the features of the invention described above can be realized using the equations and mathematical relationships described below.

Wind velocity can be estimated, for example at an aircraft during "trim aero" conditions. This estimated wind velocity can be combined with a ground velocity of the aircraft to calculate a velocity of the aircraft relative to the airmass through which it is moving. The wind velocity can also be used to calculate pitch angle of attack alpha ($\alpha$), yaw angle of attack beta ($\beta$), and total velocity or Mach number. For example, the wind velocity can be estimated at a low rate, during trim aero conditions, and then the estimated wind velocity can be used to compute total velocity, alpha and beta at a higher rate.

Alpha ($\alpha$) refers to pitch angle of attack of the aircraft relative to the airmass, or in other words whether the air is coming from above or below the nose of the aircraft, or straight at the nose of the aircraft in the pitch plane. Beta ($\beta$) refers to yaw angle of attack of the aircraft relative to the airmass, or in other words whether the air is coming from the left or right side of the aircraft nose, or straight at the nose of the aircraft in the yaw plane. Thus Beta indicates whether the aircraft is flying sideways through the airmass. When the aircraft is flying in a trim aero condition, the aircraft is flying with a fixed pitch angle of attack Alpha ($\alpha$) and a fixed yaw angle of attack Beta ($\beta$).

The wind velocity can be estimated using the following four equations.

$$F_x = T_x - q \cdot s \cdot C_A - m \cdot a_x = 0 \tag{1}$$

$$F_y = T_y + q \cdot s \cdot C_Y - m \cdot a_y = 0 \tag{2}$$

$$F_z = T_z - q \cdot s \cdot C_N - m \cdot a_z = 0 \tag{3}$$

$$W_D = 0 \tag{4}$$

In Equations (1–4), T is the thrust from the thrust model, and q is dynamic pressure. More specifically, q is a scalar, is equal to $$\frac{\rho \cdot v^2}{2},$$

and is pressure due to velocity of the aircraft with respect to the air mass through which it moves. In accordance with an exemplary embodiment of the invention, q is not measured directly, but is computed by estimating air density ($\rho$) and subtracting estimated wind velocity from known ground speed velocity. (Ground speed can be known, for example, based on information provided by an inertial navigation system onboard the aircraft).

Also in Equations (1–4) s is the reference area (which is the area of the aircraft body normal to the velocity vector at zero angle of attack), m is mass of the object, $W_D$ is the down component or vertical movement component of the wind (i.e., indicating zero velocity along the third dimension), and $C_A$, $C_y$, $C_N$ are aerodynamic coefficients. The A, Y and N subscripts represent body coordinates. Specifically, $C_A$ is the axial force coefficient, $C_y$ is the side force coefficient, and $C_N$ is the normal force coefficient.

Where the aircraft has a turbine jet engine, a thrust output of the engine can be estimated based on a speed of the engine, i.e. the RPM (revolutions per minute) of the engine. In exemplary embodiments of the invention, other parameters can be used alone or in various combinations to determine or estimate thrust output. Parameters can include a) engine parameters, b) thrust element parameters, and atmospheric parameters. Exemplary engine parameters for a turbine engine can include engine speed, rate of fuel consumption, temperatures at various locations in the turbine engine, and other parameters that indicate a power output of the engine. Exemplary engine parameters for a piston engine can include engine speed, throttle setting, manifold pressure, rate of fuel consumption, ignition timing, and so forth. Those skilled in the art will recognize that for other engine types such as rocket engines, parameters appropriate to that engine type can be measured and analyzed to provide an indication of power output and generated thrust. Thrust elements can include propellers for piston engines, fans and/or propellers for turbine engines, and so forth. The speed of the thrust element(s) and where applicable the angle of propeller or fan blades, can also be evaluated to estimate or determine thrust. With respect to atmospheric parameters, air density and temperature can be used to evaluate or determine power output of the motor, and efficiency of the thrust element(s). In an exemplary embodiment of the invention, engine speed is used as a simple measure of output thrust. In another exemplary embodiment of the invention, engine speed is mapped to an output thrust curve based on a set of standard or expected conditions or parameter values (fuel flow, air density & temperature, etc.). Alternatively, two or more parameters such as engine speed and air density can be mapped to an output thrust curve based on a set of standard or expected conditions or values of other parameters (fuel flow, blade angle, etc.).

The set of Equations (1–4) can be solved using a weighted least squares fit. This can be done, for example, by proceeding formally in the following fashion. First, write the Equations (1–4) as a vector equation $$F(q(W), c_i(W)) = 0 \tag{5}$$

Then, $$F(W_{true}) \approx F(W_{est}) + \frac{\partial F}{\partial W}[W_{true} - W_{est}] = 0 \qquad (6)$$

and $$\frac{\partial F}{\partial W} = \frac{\partial F}{\partial Q} \cdot \frac{\partial q}{\partial V_{total}} \cdot \frac{\partial V_{total}}{\partial W} + \qquad (7)$$

$$\frac{\partial F}{\partial C_N} \cdot \left(\frac{\partial C_N}{\partial V_{total}} \cdot \frac{\partial V_{total}}{\partial W} + \frac{\partial C_N}{\partial \alpha} \cdot \frac{\partial \alpha}{\partial W} + \frac{\partial C_N}{\partial \beta} \cdot \frac{\partial \beta}{\partial W}\right) +$$

$$\frac{\partial F}{\partial C_Y} \cdot \left(\frac{\partial C_Y}{\partial V_{total}} \cdot \frac{\partial V_{total}}{\partial W} + \frac{\partial C_Y}{\partial \alpha} \cdot \frac{\partial \alpha}{\partial W} + \frac{\partial C_Y}{\partial \beta} \cdot \frac{\partial \beta}{\partial W}\right) +$$

$$\frac{\partial F}{\partial C_A} \cdot \left(\frac{\partial C_A}{\partial V_{total}} \cdot \frac{\partial V_{total}}{\partial W} + \frac{\partial C_A}{\partial \alpha} \cdot \frac{\partial \alpha}{\partial W} + \frac{\partial C_A}{\partial \beta} \cdot \frac{\partial \beta}{\partial W}\right)$$

In accordance with an exemplary embodiment of the invention, the partials for $$\frac{\partial C_N}{\partial V}, \frac{\partial C_N}{\partial \alpha}, \frac{\partial C_N}{\partial \beta}, \frac{\partial C_Y}{\partial V}, \frac{\partial C_Y}{\partial \alpha}, \frac{\partial C_Y}{\partial \beta}, \frac{\partial C_A}{\partial V}, \frac{\partial C_A}{\partial \alpha}, \frac{\partial C_A}{\partial \beta}, \text{etc.},$$

can be computed numerically by multiple entries into trim aero data tables. The trim aero data tables can simply by multiple dimensioned tables for each aero coefficient. The data for a coefficient can be stored in more than one table, for example one can have a nominal $C_N$ table as a function of alpha, beta and mach, and a $C_{N\_}$correction which could be a function of, for example, an engine speed of the aircraft. The arrangement of these tables can be a strict function of an interpolation routine used to look up the data. For example, a typical table format for a variable or coefficient C(x,y,z) would be L, M, N, x(1), x(2) . . . , x(L), y(1), y(2) . . . , y(M), z(1), z(2) . . . , z(N), C(x(1, y(1), z(1)), . . . , C(x(L), y(M), z(N)).

In other words, in accordance with an exemplary embodiment of the invention, the coefficients $C_A$, $C_Y$, $C_N$ are stored in tables, and an iterative approach is used to solve the over-determined equations 1–4. A Gauss-Newton technique can be used, which requires the partial derivatives of the coefficients with respect to mach, alpha and beta (see equation 7). These derivatives can be obtained numerically by using multiple entries from the trim aero data tables and an interpolation routine to compute values between the entries. Other methods can alternatively be used, for example a nonlinear search method, a genetic algorithm, simulated annealing, and so forth as those skilled in the art will appreciate. The important thing is that the equations (1–4) are overdetermined (four equations, with three unknown wind velocity components). Alpha, beta and mach can be determined if the aircraft attitude, ground velocity, and the wind velocity are known, given some assumptions such as knowledge or predictions regarding atmospheric conditions. In exemplary embodiment of the invention, an altitude of the aircraft is used to generate nominal atmospheric parameters, and a measured air temperature is used to correct nominal air density and velocity of sound through the air.

Returning to our analysis, since there are four equations and three unknowns, the equations may be solved by a weighted least squares fit. Writing $[\epsilon W] = [W_{true} - W_{est}]$, the equations to be solved are where $\sigma_I$ represents the four weightings of each equation. As those skilled in the art will recognize, the ratio of the four weightings is important, rather than the specific value of each weighting. Using a Penrose pseudoinverse yields $$[\epsilon W] = [G] \begin{bmatrix} T_x - q \cdot S \cdot C_A - m \cdot a_x \\ T_y + q \cdot S \cdot C_Y - m \cdot a_y \\ T_z - q \cdot S \cdot C_N - m \cdot a_z \\ -W_D \end{bmatrix} \qquad (9)$$

where $$G = \left[\left(\left[\frac{1}{\sigma_I}\right] \cdot \left[\frac{\partial F}{\partial W}\right]\right)^T \cdot \left[\frac{1}{\sigma_I}\right] \cdot \left[\frac{\partial F}{\partial W}\right]\right]^{-1} \cdot \left(\left[\frac{1}{\sigma_I}\right] \cdot \left[\frac{\partial F}{\partial W}\right]\right)^T \cdot \left[\frac{1}{\sigma_I}\right] \qquad (10)$$

The updated wind estimate is $$[W] = [W] + [\epsilon W] \qquad (11)$$

Total velocity with respect to wind is $$[V_T]^{NED} = [V_E]^{NED} + [W]^{NED} \qquad (12)$$

where $[V_E]^{NED}$ is from the Inertial Navigation System, and "NED" refers to North-East-Down coordinates, i.e., earth coordinates. This can also be expressed in Body coordinates, i.e., from the reference frame of a vehicle in the airmass (front-back, left-right, up-down), in the following fashion.

$$[V_T]^{Body} = C_{NED}^{Body} \cdot [V_T]^{NED} \qquad (13)$$

where $C_{NED}^{Body}$ is a mathematical transformation from NED to Body coordinates.

In accordance with an exemplary embodiment of the invention, this mathematical transformation is performed by the Inertial Navigation System.

Computation of $\alpha$ and $\beta$ can be performed in the following fashion, where $$\alpha = a\tan\left(\frac{[V_T]^{z-body}}{[V_T]^{x-body}}\right) \qquad (14)$$

and $$\beta = a\sin\left(\frac{[V_T]^{y-body}}{|[V_T]|}\right) \qquad (15)$$

In summary, the technique of constraining the wind velocity in the third dimension to be nominally zero in the set of force equations (1–3) via the equation (4), produces an over-determined set of equations whose contributions to the wind estimate and/or the pitch angle of attack, yaw angle of attack and airspeed triad of variables may be controlled by adjusting the weight, $\sigma_I$, assigned to each of the equations. This method or technique can also be performed using an iterated measurement Kalman filter implementation. Computation operations of the method can for example be performed by a digital microprocessor or computer system, located for example on board the aircraft, and can be performed by one or more computing machine(s) (digital or analog) working separately or together. In an exemplary embodiment of the invention, a fresh wind velocity estimate is generated every tenth of a second, i.e., at a rate of 10 hertz. In other embodiments the wind velocity is estimated at different rates, faster and/or slower than 10 hertz, based on the available computing power and on the requirements of the particular application or use of the wind estimate.

In addition, in accordance with an exemplary embodiment of the invention and based on the principles described above, the wind can be estimated using lift, drag and aerodynamic roll angle, where the accelerometer data are rotated through the angles of attack, which are being estimated.

Figure 3:
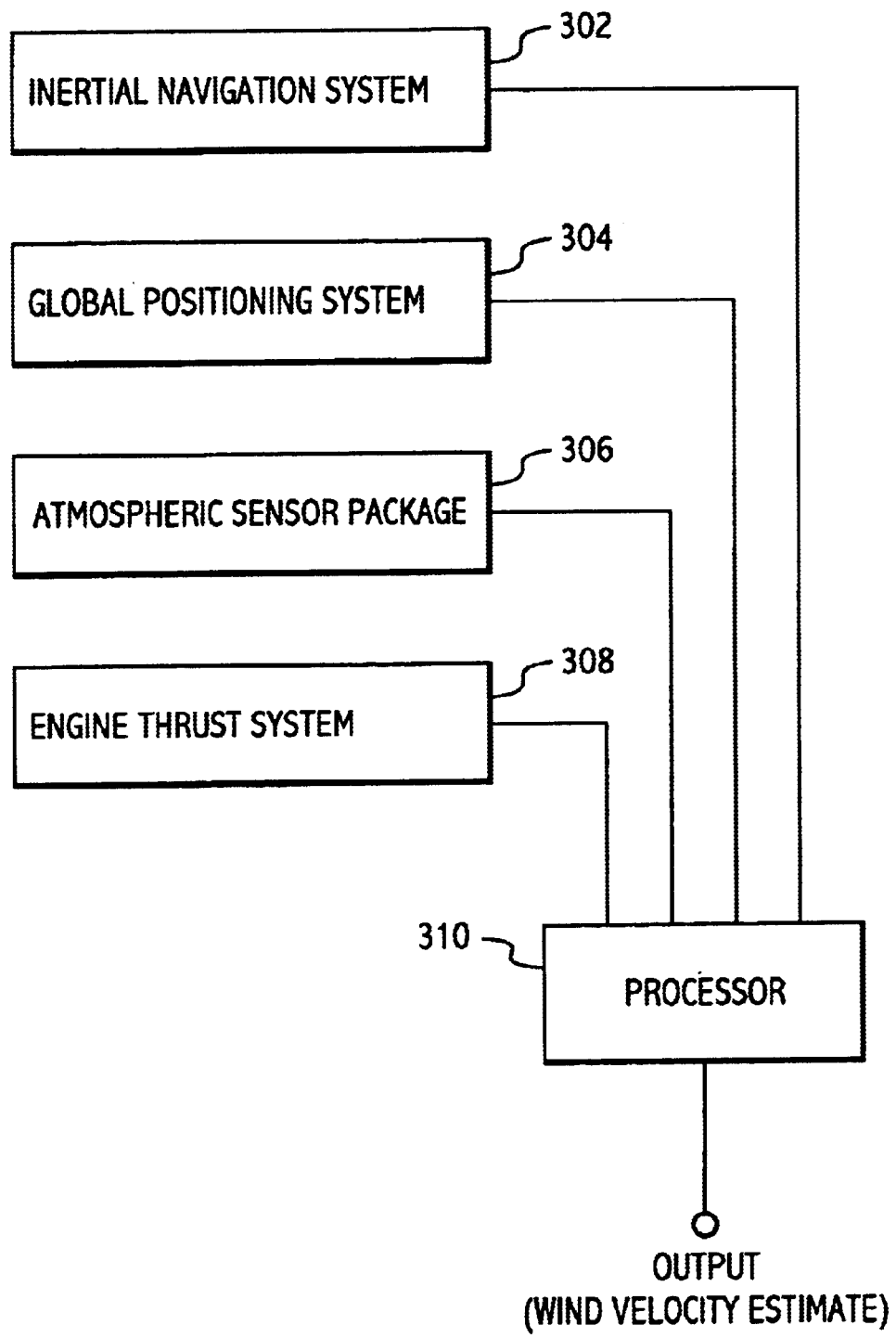
FIG. 3 shows a block diagram of an exemplary embodiment of the invention.

FIG. 3 shows a block diagram of an exemplary embodiment of the invention, capable of performing the various functions described above. Specifically, FIG. 3 shows an Inertial Navigation System 302 and a Global Positioning System 304 connected to a processor 310 to provide position information of an aircraft relative to an object such as the earth. Those skilled in the art will appreciate that the position information can indicate an attitude or orientation of the aircraft relative to the object, as well as distance information. Those skilled in the art will also appreciate that the processor 310 can determine velocity and acceleration information by analyzing changes in the position information over time.

FIG. 3 also shows an Engine Thrust System 308 connected to provide engine thrust information, or information necessary for the processor 310 to determine output thrust of the aircraft's engine or motor, such as motor speed or any of the parameters described further above with respect to output thrust. The Engine Thrust System 308 can comprise, for example, connections to engine control and/or monitoring instruments that provide information signals which the processor 310 can use. The System 308 can also include engine control and/or monitoring instruments.

FIG. 3 also shows an atmospheric sensor package 306 connected to provide atmospheric information to the processor 310. The atmospheric information can include, for example, air temperature at or near the aircraft, ambient air pressure at or near the aircraft, and so forth. The atmospheric information can be obtained by sensors onboard the aircraft. Alternatively, the atmospheric information can be obtained by sensors not on board the aircraft and then transmitted by a telecommunication link to the processor 310. In a preferred embodiment, the link is a wireless link. The processor 310 can be located on board the aircraft. Alternatively, the processor 310 can be located off board the aircraft at a location remote from the aircraft. In that case position information and any other necessary information originating on the aircraft would be transmitted to the processor 310 by a telecommunications link, and the resulting wind estimate output by the processor 310 would then be transmitted or otherwise conveyed to the pilot and/or autopilot of the aircraft. Those skilled in the art will recognize that exemplary aircraft can be remotely piloted. Those skilled in the art will also recognize that the processor 310 can be implemented as a digital microprocessor or computer system or as an analog computer, and can be implemented as two or more computing machines (digital or analog) working separately or together, at the same or different physical locations.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A method for estimating, at a first object in a fluid, a velocity of the fluid relative to a second object, comprising:
    determining an acceleration of the first object relative to the second object;
    determining a dynamic pressure of the fluid on the first object;
    determining a thrust vector of the first object relative to the second object; and
    estimating the velocity of the fluid relative to the second object in three dimensions, based on the determined acceleration, the determined dynamic pressure, the determined thrust vector and an assumption that a speed of the fluid along a single dimension and relative to the second object is zero.

2. The method of claim 1, wherein the step of estimating the velocity of the fluid comprises:
    combining force equations and a velocity equation to form an over-constrained set of equations, wherein the velocity equation indicates an assumed zero speed of the fluid along the third dimension relative to the second object, and the force equations include the determined acceleration, the determined dynamic pressure, and the determined thrust vector.

3. The method of claim 2, wherein the step of estimating the velocity of the fluid comprises:
    solving the over-constrained set of equations via a weighted least squares fit, wherein the weighting determines relative influence of the force equations versus the velocity equation on the fluid velocity estimate.

4. The method of claim 3, comprising:
    adjusting the weighting to increase influence of the velocity equation and decrease influence of the force equations on the fluid velocity estimate, as a degree of certainty that the speed of the fluid along the third dimension is zero, decreases.

5. The method of claim 3, comprising:
    adjusting the weighting based on a distance between the first object and the surface of the earth.

6. The method of claim 1, further comprising:
    determining an orientation of the first object with respect to a velocity of the first object relative to the fluid, based on a velocity of the first object relative to the second object, an orientation of the first object with respect to the second object, and the determined velocity of the fluid relative to the second object.

7. The method of claim 1, wherein:
    the velocity of the fluid relative to the second object is a three-dimensional vector;
    the acceleration is a three-dimensional vector; and
    the thrust vector is a three-dimensional vector.

8. The method of claim 7, wherein the velocity of the fluid relative to the second object is determined based on a mass of the first object, a reference area of the first object, and aerodynamic coefficients of the first object.

9. The method of claim 8, wherein the aerodynamic coefficients include an aerodynamic coefficient along each axis of the first object.

10. The method of claim 1, wherein the steps of determining the acceleration, determining the dynamic pressure, and determining the thrust vector are performed based on acceleration, dynamic pressure, and thrust data gathered when the first object has a steady state pitch angle of attack relative to the fluid and a steady state yaw angle of attack relative to the fluid.

11. The method of claim 1, wherein the second object has a fixed position relative to the earth.

12. A method for estimating air velocity of a vehicle, comprising:
    determining a parameter associated with the vehicle; and
    determining a weighting factor to weight force equations and a velocity equation in an equation set, based on the determined parameter; and solving the weighted equation set to estimate the air velocity of the vehicle.

13. The method of claim 12, wherein the parameter indicates a probability of vertical velocity of the air with respect to a surface of the earth.

14. The method of claim 13, wherein the parameter corresponds to an altitude of the vehicle above a surface of the earth.

15. The method of claim 13, wherein the vehicle comprises an engine and the force equations describe thrust force of the engine and aerodynamic forces acting on the vehicle.

16. A device for estimating, at a first object in a fluid, a velocity in three dimensions of the fluid relative to a second object, comprising:

a computer arranged to perform the steps of claim 1.

17. The device of claim 16, comprising:

at least one of an Inertial Navigation System and a Global Positioning System, connected to the computer to provide a position of the first object relative to the second object.

18. The device of claim 16, wherein the computer is arranged to perform the step of claim 2.

19. The device of claim 16, wherein the computer is arranged to perform the step of claim 3.

20. The device of claim 16, wherein the computer is arranged to perform the step of claim 4.

21. The device of claim 16, wherein the computer is arranged to perform the step of claim 5.

22. A method for estimating, at a first object in a fluid, a velocity of the fluid relative to a second object, comprising:

estimating the velocity of the fluid relative to the second object in three dimensions, based on a determined acceleration of the first object relative to the second object, a determined dynamic pressure of the fluid on the first object, a determined thrust vector of the first object relative to the second object, and an assumption that a speed of the fluid along a single dimension and relative to the second object is zero.

23. The method of claim 22, wherein the step of estimating the velocity of the fluid comprises:

combining force equations and a velocity equation to form an over-constrained set of equations, wherein the velocity equation indicates an assumed zero speed of the fluid along the third dimension relative to the second object, and the force equations include the determined acceleration, the determined dynamic pressure, and the determined thrust vector.

24. The method of claim 23, wherein the step of estimating the velocity of the fluid comprises:

solving the over-constrained set of equations via a weighted least squares fit, wherein the weighting determines relative influence of the force equations versus the velocity equation on the fluid velocity estimate.

25. The method of claim 23, wherein the step of estimating the velocity of the fluid comprises:

solving the over-constrained set of equations, wherein the equations are weighted to determine relative influence of the force equations versus the velocity equation on the fluid velocity estimate.

26. The method of claim 25, comprising:

adjusting the weighting to increase influence of the velocity equation and decrease influence of the force equations on the fluid velocity estimate, as a degree of certainty that the speed of the fluid along the third dimension is zero, decreases.

27. The method of claim 25, comprising:

adjusting the weighting based on a distance between the first object and the surface of the earth.

28. A device for estimating, at a first object in a fluid, a velocity in three dimensions of the fluid relative to a second object, comprising:

a computer arranged to perform the steps of claim 12.

* * * * *